United States Patent

Schilde et al.

Patent Number: 5,398,452
Date of Patent: Mar. 21, 1995

[54] SCREWED FIXING OF A RETAINING OR FIXING MEMBER TO A LAMINATED GLAZING

[75] Inventors: Heinz Schilde, Wurselen; Friendrich Triebs; Franz Kramling, both of Aachen, all of Germany

[73] Assignee: Saint-Gobain Vitrage International c/o Saint-Gobain Recherche, Aubervilliers, France

[21] Appl. No.: 224,533

[22] Filed: Apr. 7, 1994

[30] Foreign Application Priority Data

Apr. 7, 1993 [DE] Germany ............... 43 11 442.3

[51] Int. Cl.⁶ ............................................. E06B 3/00
[52] U.S. Cl. ........................................ 49/501; 49/404; 49/506; 52/789
[58] Field of Search ............. 49/501, 506, 404, 440, 49/441; 52/789, 788

[56] References Cited

U.S. PATENT DOCUMENTS

| 4,628,637 | 12/1986 | Okada et al. ............ 49/440 X |
| 4,631,865 | 12/1986 | Motonami et al. ........ 49/440 X |
| 4,782,629 | 11/1988 | Mori et al. .............. 49/440 X |
| 4,901,476 | 2/1990 | Nagashima et al. ....... 49/501 X |

FOREIGN PATENT DOCUMENTS

| 189753 | 8/1986 | European Pat. Off. ........ 49/404 |
| 0340089 | 11/1989 | European Pat. Off. . |
| 0368728 | 5/1990 | European Pat. Off. . |
| 0533566 | 3/1993 | European Pat. Off. . |

Primary Examiner—Philip C. Kannan
Attorney, Agent, or Firm—Oblon, Spivak, McClelland, Maier, & Neustadt

[57] ABSTRACT

A metal retaining or fixing member (6) is fixed to a laminated glazing (1) with the aid of a screwed assembly. The two glass sheets (2,3) forming the laminated glazing (1) are provided with holes (15,16) before being assembled with the thermoplastic interlayer (4), in such a way that following the manufacture of the laminated glazing, they are eccentric with respect to one another. Prior to the screwing down of the assembly, the empty space separating the parts (9,18) of said assembly located within the holes 15,16) and the walls thereof is filled with curable adhesive (20).

6 Claims, 1 Drawing Sheet

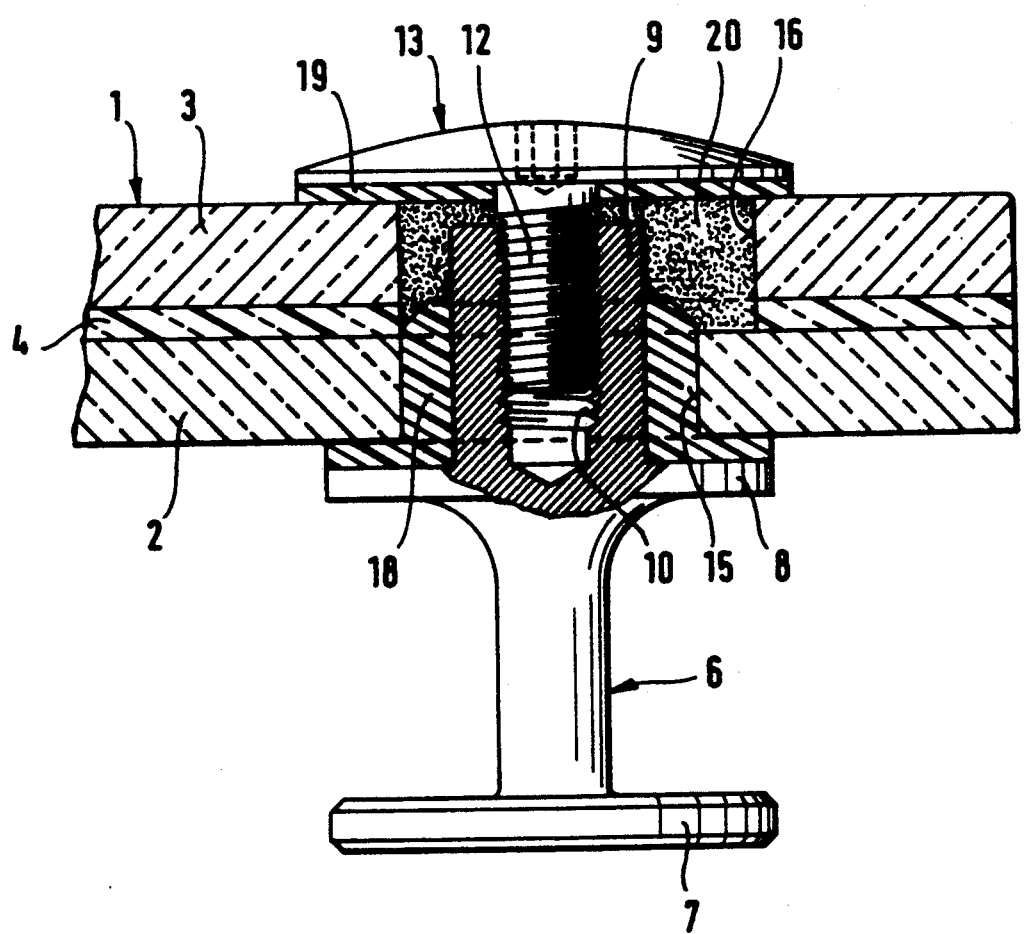

SCREWED FIXING OF A RETAINING OR FIXING MEMBER TO A LAMINATED GLAZING

BACKGROUND OF THE INVENTION

1. Field of the Invention

The invention relates to a process for fixing a retaining or fixing member to a laminated glazing with the aid of a screwed assembly passing through the laminated glazing.

2. Discussion of the Background

Screwed assemblies are normally used for monolithic glazings. One or more holes are made in the glazing and two clamping parts are applied to the two faces of the glazing joined together by a screwed assembly passing through the hole or holes. In many cases, such assemblies cause problems for laminated glazings. Under the influence of the clamping forces exerted by the screwed assembly, a creep effect can occur, i.e. a plastic deformation of the thermoplastic interlayer of the laminated glazing in the area around the hole. Thus, the thickness of the laminated glazing contracts in this region, so that the screwed assembly is loosened. The screws, on becoming loose, can lead to a supplementary play on the part of the fixture.

SUMMARY OF THE INVENTION

It is an object of the invention to develop a screwed assembly for laminated glazings which reliably avoids the risk of loosening and untimely detachment of the screwed assembly and its process of assembly.

According to the process of the invention, the above and other objects are achieved by providing each of the glass sheets forming the laminated glazing with holes before being assembled with the thermoplastic interlayer. The holes are eccentric with respect to one another following the manufacture of the laminated glazing. The empty space separating parts located within the holes of the screwed assembly and the walls of the holes are filled with a curable plastic adhesive.

By filling with a curable adhesive the space separating the parts of the screwed assembly passing through the holes and the walls thereof, an incompressible abutment is created between the clamping surfaces of the screwed assembly which, after curing, absorbs the clamping forces and prevents the plastic deformation of the thermoplastic interlayer, e.g., during heating caused by solar radiation. Moreover, the eccentric arrangement of the holes with respect to one another prevents any distortion of said abutment within the holes.

As an eccentric arrangement, it is, e.g., possible for one of the holes to have a larger diameter than the other.

In view of the fact that the adhesive used for producing the abutment ensures an adequate bonding with the material of the screwed assembly, the threaded screw and the complementary part of the screwed assembly cooperating therewith are also reliably prevented from becoming loose. The adhesive can be a curable plastic adhesive. It is, e.g., a single-component adhesive or a two-component epoxy adhesive.

According to the invention, the screwed assembly requires a relatively low tightening torque of around 0.5 Nm.

The process according to the invention is particularly effective, e.g., for the durable fixing of guide pins to sliding side windows for cars. It is for this reason that the following description of an embodiment shown in the drawing concerns the fixing of such a guide pin to a laminated lateral glazing.

BRIEF DESCRIPTION OF THE DRAWINGS

The sole FIGURE illustrates a section through one embodiment of the invention.

DETAILED DESCRIPTION OF THE PREFERRED EMBODIMENT

The laminated glazing 1 is constituted by two glass sheets 2,3 assembled with a thermoplastic interlayer 4, e.g., a 0.76 mm thick PVB sheet, via heat and pressure. The laminated glazing 1 is in this example a convex side glazing which slides vertically in a door and which is guided by means of one or more metal pins 6 firmly fitted to the laminated glazing, the pins sliding in rails extending roughly vertically along the glazing frame. For reasons of simplicity the guide rail, with which the guide pin 6 cooperates, is not shown in the drawing.

The guide pin 6 includes the gripping section 7, a circular bearing surface 8 and a hollow cylindrical section 9 provided with an internal thread 10 and which enters the hole 15 in the laminated glazing. The thread 12 of an oval head screw 13 is screwed to the hollow cylindrical section 9.

The glass sheet 2 of the laminated glazing is provided, at the location of the guide pin 6, with the hole 15 and the glass sheet 3 is provided with a hole 16. The diameter of the hole 16 is, in the case shown, larger than that of the hole 15. For example, the diameter of the hole 15 can be 10 mm and that of the hole 16, 12 mm. The holes 15 and 16 are arranged with a slight lateral displacement in such a way that they are eccentric to one another when the laminated glazing has been manufactured.

Between the bearing part 8 and the hollow cylindrical part 9 of the guide pin 6, on the one hand, and the glass sheet 2 in the region of the hole 15, on the other, is a polymer centering sleeve 18. Between the oval head of the screw 13 and the surface of the glass sheet 3 is inserted a cushion plate 19 also made from a suitable polymer.

In order to fix the guide pin 6, the centering sleeve 18 is placed on the hollow cylindrical section 9 of the guide pin 6, and the hollow cylindrical section 9 provided in this way with the centering sleeve 8 is inserted into the hole 15. The space within the wall of the hole 16 is then filled with a curable adhesive. The screw 13 is then screwed into the thread 10 with a relatively low tightening torque of roughly 0.5 Nm and then the adhesive is allowed to cure.

For example, for this purpose use is made of an epoxy adhesive having two components or one component of a thermosetting system. The adhesive cures to form a thermosetting material and, after curing, it forms a solid interlayer in the vicinity of the hole 16.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for fixing a member to a laminated glazing, comprising the steps of:
    forming a laminated glazing by assembling glass sheets having holes therein such that the holes are eccentric to one another in the formed laminated glazing;

inserting a threaded part of the member into said holes while leaving an empty space between said threaded part and walls of at least one of said holes;

filling the empty space with a curable plastic adhesive; and threadably mating a screw with said threaded part to mechanically fix said member to said glazing.

2. Process according to claim 1 where said forming step comprises eccentrically arranging holes of different diameters.

3. Process according to claim 1 wherein said adhesive comprises a two component, epoxy curable plastic adhesive.

4. Process according to claim 1 wherein said adhesive comprises a single component, epoxy curable plastic adhesive.

5. Process according to claim 1 wherein said threadably mating step comprises tightening the screw to a torque of about 0.5 Nm.

6. A sliding vehicular glazing assembly comprising:

a laminated glazing having eccentric holes;

a guide pin having a threaded part inserted in said eccentric holes such that an empty space remains between said threaded part and walls of at least one of said holes;

a curable plastic adhesive filling the empty space; and a screw threadably mated with said threaded part and mechanically fixing said guide pin to said glazing.

* * * * *

UNITED STATES PATENT AND TRADEMARK OFFICE
CERTIFICATE OF CORRECTION

PATENT NO. : 5,398,452
DATED : March 21, 1995
INVENTOR(S) : Heinz SCHILDE, et al.

It is certified that error appears in the above-indentified patent and that said Letters Patent is hereby corrected as shown below:

On the title page, Item [75], the second inventor's name should read:

--Friedrich Triebs--

Signed and Sealed this

Sixth Day of June, 1995

*Attest:*

BRUCE LEHMAN

*Attesting Officer*  *Commissioner of Patents and Trademarks*